US011660935B2

(12) United States Patent
Gutowski et al.

(10) Patent No.: US 11,660,935 B2
(45) Date of Patent: May 30, 2023

(54) VEHICLE CABIN AND HIGH VOLTAGE BATTERY THERMAL MANAGEMENT SYSTEM

(71) Applicant: Ford Global Technologies, LLC, Dearborn, MI (US)

(72) Inventors: Alan Gutowski, Wixom, MI (US); Curtis Mark Jones, Wixom, MI (US); William Stewart Johnston, South Lyon, MI (US); Manfred Koberstein, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 17/022,690

(22) Filed: Sep. 16, 2020

(65) Prior Publication Data

US 2020/0406716 A1    Dec. 31, 2020

Related U.S. Application Data

(62) Division of application No. 15/927,592, filed on Mar. 21, 2018, now Pat. No. 10,814,700.

(51) Int. Cl.
*B60H 1/32*    (2006.01)
*B60H 1/00*    (2006.01)

(52) U.S. Cl.
CPC ......... *B60H 1/323* (2013.01); *B60H 1/00278* (2013.01); *B60H 1/00385* (2013.01);
(Continued)

(58) Field of Classification Search
CPC .. B60H 1/00278; B60H 1/323; B60H 1/3205; B60H 1/00385; B60H 1/00885;
(Continued)

(56) References Cited

U.S. PATENT DOCUMENTS 9,583,800 B2   2/2017  Hwang et al.
9,776,469 B1   10/2017 Smith
(Continued)

FOREIGN PATENT DOCUMENTS

JP   2004306859 A  * 11/2004

*Primary Examiner* — Tho V Duong
(74) *Attorney, Agent, or Firm* — David B. Kelley; Brooks Kushman P.C.

(57) ABSTRACT

A vehicle thermal management system including an electric powertrain, a single thermal loop, and a controller is provided. The electric powertrain includes a high voltage battery. The single thermal loop is for managing thermal conditions of the high voltage battery and a vehicle cabin and may include a climate control system, a blower, and a front evaporator in fluid communication with the vehicle cabin. The controller is programmed to, responsive to detection of a climate control system off request, output a command to direct the blower to push air through a heater core to the vehicle cabin at a predetermined temperature such that a temperature within the vehicle cabin is maintained at a predetermined temperature and refrigerant continues to flow through the front evaporator. The system may include a vehicle cabin temperature sensor and an ambient temperature sensor, each in electrical communication with the controller.

3 Claims, 5 Drawing Sheets

(52) U.S. Cl.
CPC ............... B60H 1/00885 (2013.01); *B60H 2001/00949* (2013.01); *B60H 2001/3266* (2013.01); *B60H 2001/3282* (2013.01); *B60H 2001/3283* (2013.01)

(58) Field of Classification Search
CPC .......... B60H 2001/00128; B60H 2001/00949; B60H 2001/3266; B60H 2001/3282; B60H 2001/3283
See application file for complete search history.

(56) References Cited

U.S. PATENT DOCUMENTS

| | | | |
|---|---|---|---|
| 2008/0202741 A1 | 8/2008 | Lee et al. | |
| 2009/0249807 A1 | 10/2009 | Nemesh et al. | |
| 2013/0014931 A1* | 1/2013 | Hashigaya | B60H 1/00764 165/287 |
| 2014/0216693 A1 | 8/2014 | Pekarsky et al. | |
| 2016/0339760 A1* | 11/2016 | Dunn | H01M 10/625 |
| 2016/0355068 A1 | 12/2016 | Sutherland et al. | |
| 2017/0088006 A1* | 3/2017 | Blatchley | B60H 1/323 |
| 2017/0309976 A1* | 10/2017 | Lambert | H01M 10/633 |
| 2018/0006347 A1* | 1/2018 | Porras | H01M 10/6568 |
| 2018/0097266 A1* | 4/2018 | Jalilevand | B60H 1/3205 |
| 2018/0222286 A1 | 8/2018 | Blatchley et al. | |
| 2018/0345815 A1* | 12/2018 | Porras | B60L 58/27 |
| 2018/0370330 A1 | 12/2018 | Vespa et al. | |
| 2019/0111760 A1 | 4/2019 | Xu et al. | |

* cited by examiner

VEHICLE CABIN AND HIGH VOLTAGE BATTERY THERMAL MANAGEMENT SYSTEM

CROSS-REFERENCE TO RELATED APPLICATIONS

This application is a divisional of U.S. application Ser. No. 15/927,592, filed Mar. 21, 2018, now U.S. Pat. No. 10,814,700, issued Oct. 27, 2020, the disclosure of which is hereby incorporated in its entirety by reference herein.

TECHNICAL FIELD

The present disclosure relates to thermal management systems to assist in managing thermal conditions for cabins and high voltage batteries of vehicles.

BACKGROUND

Vehicle thermal management systems may include a first thermal loop for managing thermal conditions of a high voltage battery and a second thermal loop for managing thermal conditions of a vehicle cabin. Electrified vehicles often include a powertrain requiring an air conditioning (A/C) system to provide cooling functions to the high voltage battery. The powertrain may still engage the A/C system to cool the high voltage battery in a scenario in which a passenger requests climate control off or A/C system off. In this scenario, engagement of the A/C system leads to undesired cooling of the vehicle cabin contrary to the requested climate control off or A/C system off made by the passenger.

SUMMARY

A vehicle thermal management system includes an electric powertrain, a single thermal loop, and a controller. The electric powertrain includes a high voltage battery. The single thermal loop is for managing thermal conditions of the high voltage battery and a vehicle cabin and includes a climate control system, a blower, and a front evaporator in fluid communication with the vehicle cabin. The controller is programmed to, responsive to detection of a climate control system off request, output a command to direct the blower to push air through a heater core to the vehicle cabin at a predetermined temperature such that a temperature within the vehicle cabin is maintained at a predetermined temperature and refrigerant continues to flow through the front evaporator. The system may include a vehicle cabin temperature sensor and an ambient temperature sensor, each in electrical communication with the controller. The predetermined temperature may be based on temperature sensor signals received by the controller from one of the vehicle cabin temperature sensor or the ambient temperature sensor. The system may include a chiller. The controller may be further programmed to control coolant flow through the chiller to maintain a temperature of the high voltage battery within a predetermined temperature range and to reduce an impact on vehicle cabin temperature. The controller may be further programmed to direct the blower to output the air to the vehicle cabin and maintain coolant flow through a chiller in accordance with noise, vibration, and harshness standards. The system may include a rear evaporator. The single thermal loop may include only one evaporator shut off valve in fluid communication with one of the front evaporator or the rear evaporator. The system may include a chiller arranged with the front evaporator such that the coolant flow continues to maintain a predetermined temperature of the high voltage battery and refrigerant flows through the front evaporator while the blower outputs air to the vehicle cabin at a temperature based on a vehicle cabin temperature or an ambient temperature. The controller may be further programmed set the blower at a predetermined low speed. The controller may be further programmed to output the command to the blower to push air through the heater core based on a detected compressor speed being above a predetermined threshold. The controller may be further programmed to output the command to the blower to push air through the heater core based on a detected front evaporator temperature being below a predetermined threshold.

A vehicle thermal management system includes a blower, an evaporator a chiller, and a controller. The blower and evaporator are in fluid communication with a vehicle cabin. The chiller is for facilitating fluid communication between the evaporator and a high voltage battery. The controller is programmed to, responsive to detection of a front control head of an air conditioning system in an off state, output a control signal to the blower to move air across a heat source and to the vehicle cabin at a predetermined temperature while maintaining refrigerant flow through the evaporator and maintaining coolant flow through the chiller to maintain a high voltage battery temperature within a predetermined battery temperature range. The controller may be further programmed to adjust the predetermined temperature of the air to the vehicle cabin based on detected changes in vehicle cabin temperature. The controller may be further programmed to output the control signal to the blower based on a detected climate control system off request and a high voltage battery temperature being above a predefined threshold. Refrigerant flow to the evaporator may not be controlled by a shut-off valve. The system may further include a compressor in fluid communication with a climate control system and a compressor speed sensor. The controller may be further programmed to output the control signal to the blower based on a detected compressor speed. The controller may be further programmed to activate a blend door control to move the air across the heat source based on detection of a thermal management system front control head in an off status.

A vehicle thermal management control strategy outputs a command, by a controller, for a blower to direct airflow across a heat source en route to a vehicle cabin to maintain a temperature of the vehicle cabin at or above a detected ambient temperature outside the vehicle cabin in response to detection of an air-conditioning system off request. The controller may be programmed to responsive to the detection of the air-conditioning system off request, output a command to a chiller to maintain coolant flow and to output a command to an evaporator to maintain refrigerant flow. The controller may be further programmed to update a temperature of the airflow based on changed and detected vehicle cabin temperatures. The controller may be further programmed to control a flow of refrigerant to an evaporator without a use of a shut-off valve.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
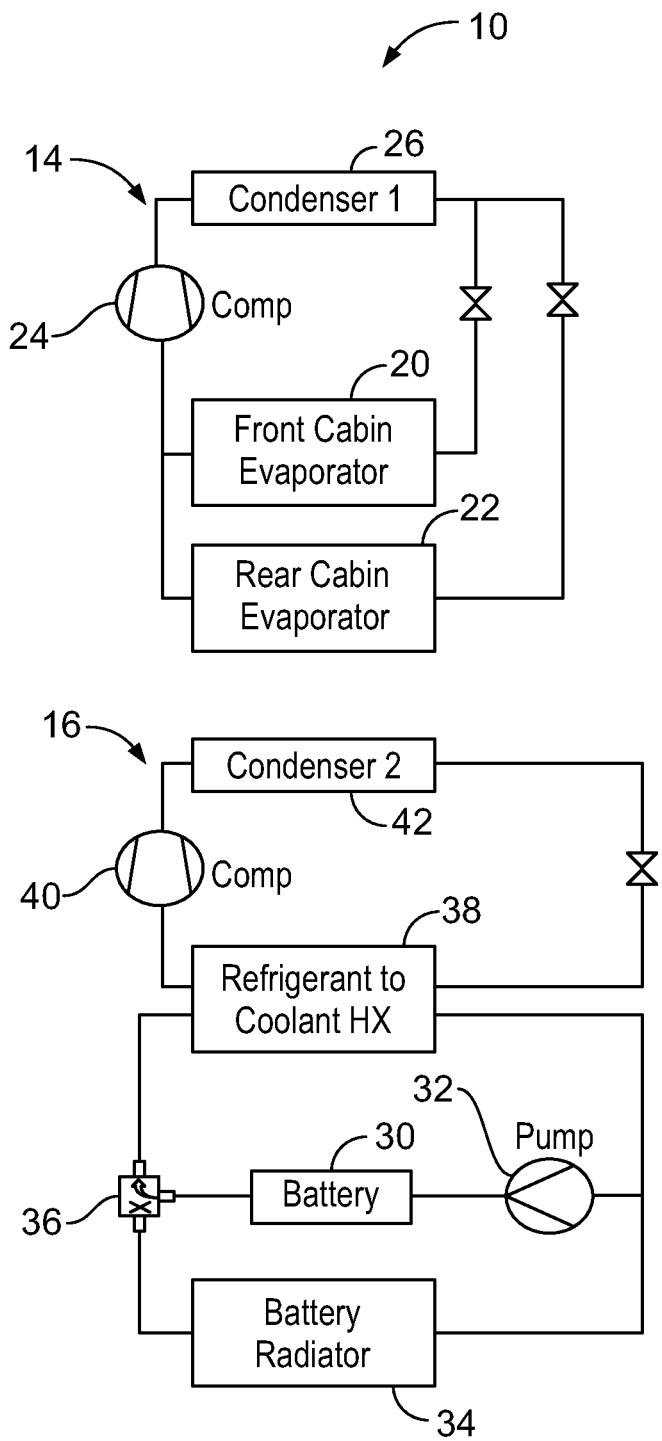
FIG. 1 is a schematic diagram illustrating an example of a portion of a prior art architecture for a vehicle thermal management system including two thermal loops.

FIG. 1 is a schematic diagram illustrating a portion of an architecture of a vehicle thermal management system, referred to generally as a thermal management system 10 herein. The thermal management system 10 includes a first thermal loop 14 and a second thermal loop 16. As used herein, a thermal loop is a vehicle system loop including vehicle components and a conduit assembly to transfer fluid for managing thermal conditions of the vehicle components and portions of the vehicle adjacent thereto. The first thermal loop 14 assists in controlling thermal conditions of a vehicle cabin. The first thermal loop includes a front cabin evaporator 20, a rear cabin evaporator 22, a compressor 24, and a condenser 26.

The second thermal loop 16 assists in controlling thermal conditions of a high voltage battery. The second thermal loop 16 includes a high voltage battery 30, a pump 32, a battery radiator 34, a three-way valve 36, a refrigerant to coolant heat exchanger 38, a compressor 40, and a condenser 42. In this example, the first thermal loop 14 and the second thermal loop 16 are not in fluid communication with one another and operate separately.

Figure 2:
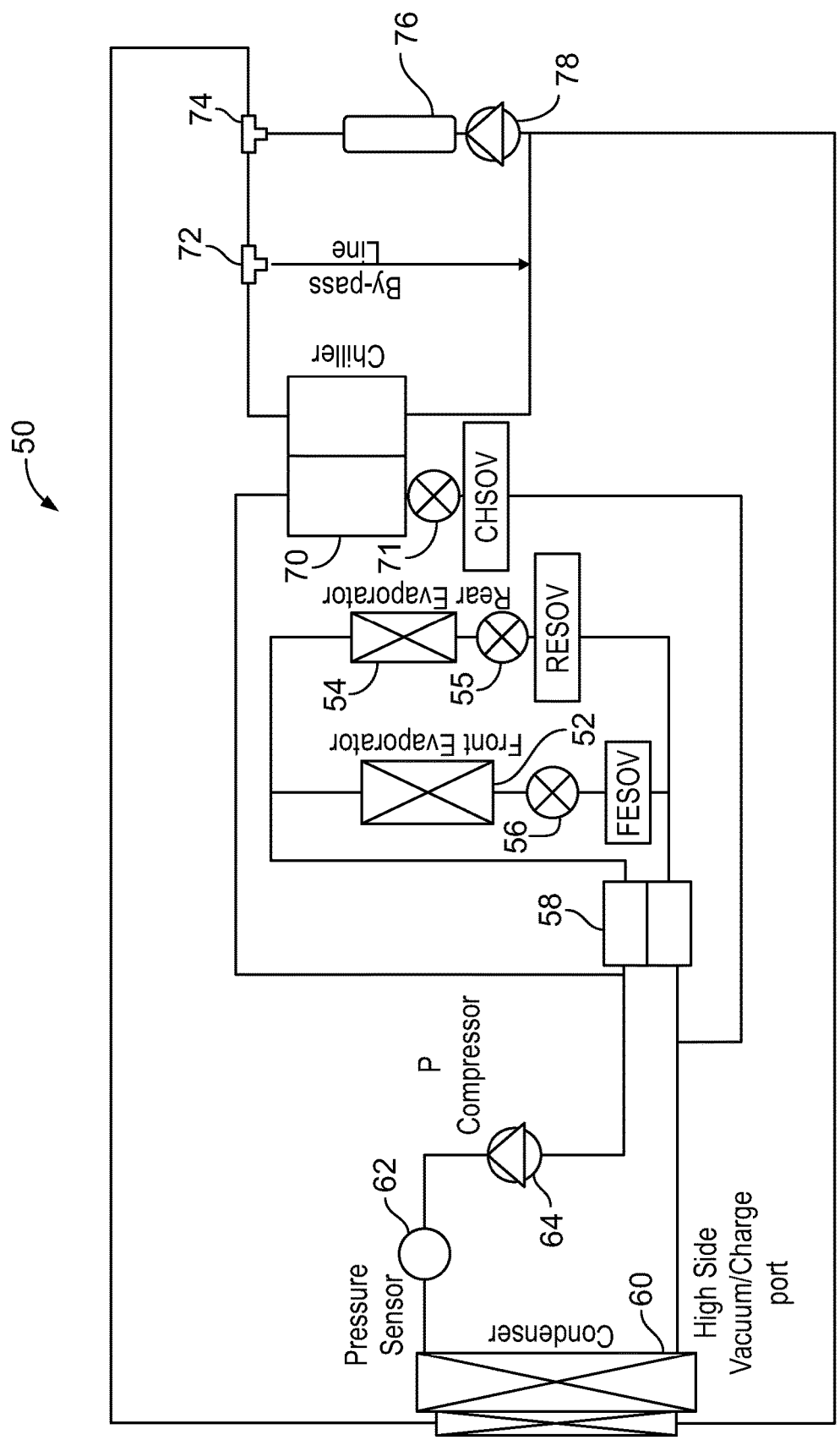
FIG. 2 is a schematic diagram illustrating an example of a portion of an architecture for a vehicle thermal management system including a front evaporator shut-off valve.

FIG. 2 is a schematic diagram illustrating another portion of an architecture of a vehicle thermal management system, referred to generally as a thermal management system 50 herein. The thermal management system 50 includes a front evaporator 52 and a rear evaporator 54. A rear evaporator shut-off valve (RESOV) 55 may control a flow of refrigerant to the rear evaporator 54. A front evaporator shut-off valve (FESOV) 56 may control flow of refrigerant to the front evaporator 52. The thermal management system 50 may further include an internal heat exchanger 58, a condenser 60, a pressure sensor 62, and a compressor 64. A chiller 70 may assist in transferring heat between portions of the thermal management system 50 to assist in maintaining thermal conditions of a high voltage battery. A chiller shut-off valve (CHSOV) 71 may control a flow of refrigerant to the chiller 70.

Coolant may travel from the chiller 70 through a first three-way valve 72 and a second three-way valve 74 en route to a high voltage battery 76. A pump 78 may assist in controlling movement of the coolant to assist in managing thermal conditions of the high voltage battery 76. The first three-way valve 72 may operate to direct the coolant from the chiller 70 through a bypass line to avoid distributing the coolant to the high voltage battery 76. The second three-way valve 74 may operate to direct the coolant to a radiator 80 instead of to the high voltage battery 76. In comparison to the thermal management system 10, the thermal management system 50 includes only one thermal loop to manage thermal conditions of the vehicle cabin and the high voltage battery 76.

Figure 3A:
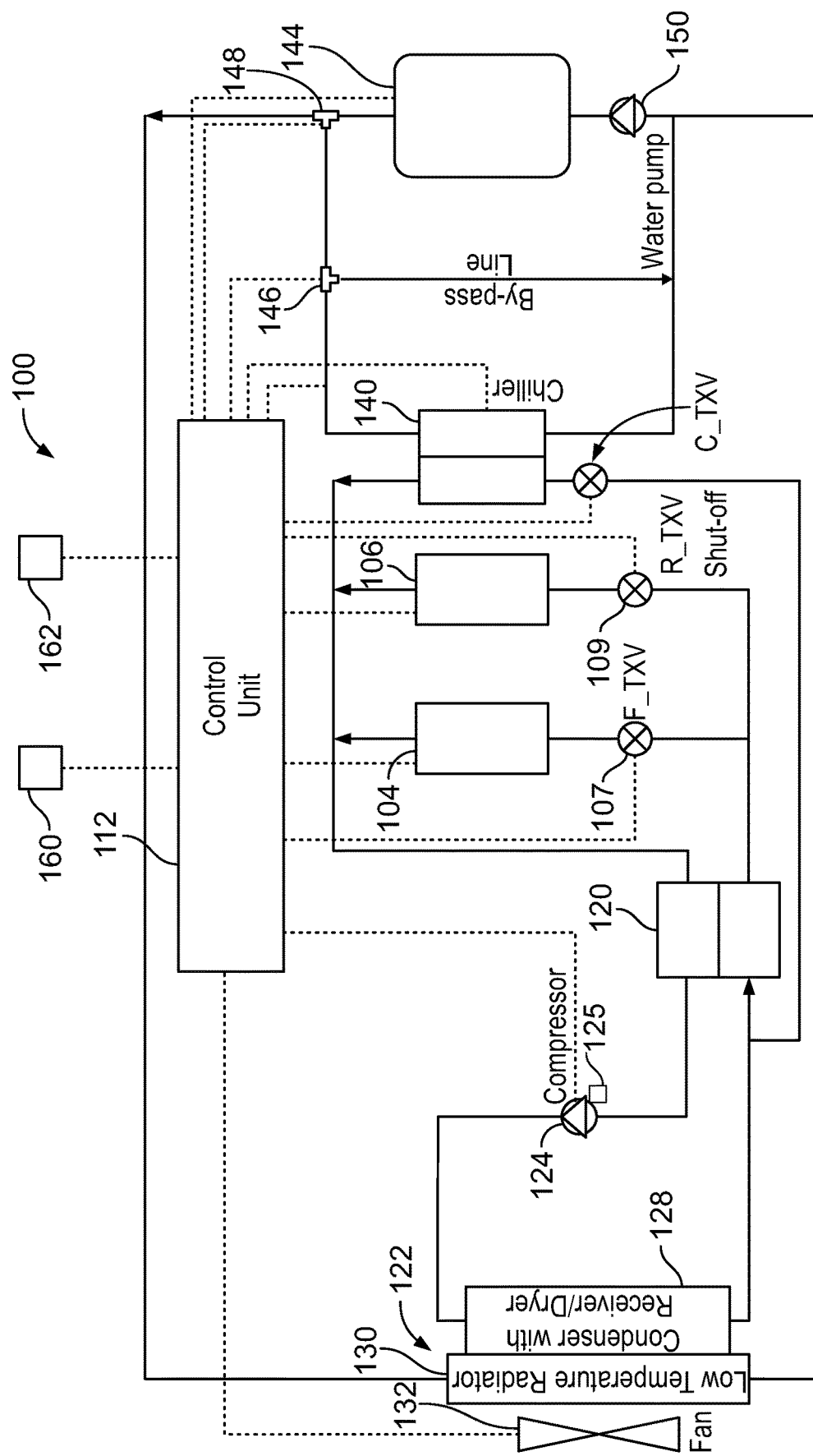
FIG. 3A is a schematic diagram illustrating an example of a portion of an architecture for a vehicle thermal management system without a front evaporator shut-off valve and including a control unit.

FIG. 3A is a schematic diagram illustrating an example of a portion of an architecture of a vehicle thermal management system, referred to generally as a thermal management system 100. In contrast to the thermal management system 10, the thermal management system 100 includes only one thermal loop to manage thermal conditions of a vehicle cabin and a high voltage battery. Inclusion of only one thermal loop instead of two thermal loops provides an architecture with fewer components and reduced assembly time thus presenting cost advantages in comparison to the thermal management system 10 of FIG. 1.

The thermal management system 100 includes components to assist in managing thermal conditions of the vehicle cabin and the high voltage battery with one less shut-off valve in comparison to the thermal management system 50. For example, the thermal management system 100 may include a front heating, ventilating, and air conditioning (HVAC) system 104 and a rear HVAC system 106. Each of the front HVAC system 104 and the rear HVAC system 106 may be in fluid communication with a vehicle cabin (not shown in FIG. 3A) to assist in managing thermal comfort of passengers within the vehicle cabin. Each of the front HVAC system 104 and the rear HVAC system 106 may include an evaporator, a blower, a heat source, and a conduit system.

Figure 3B:
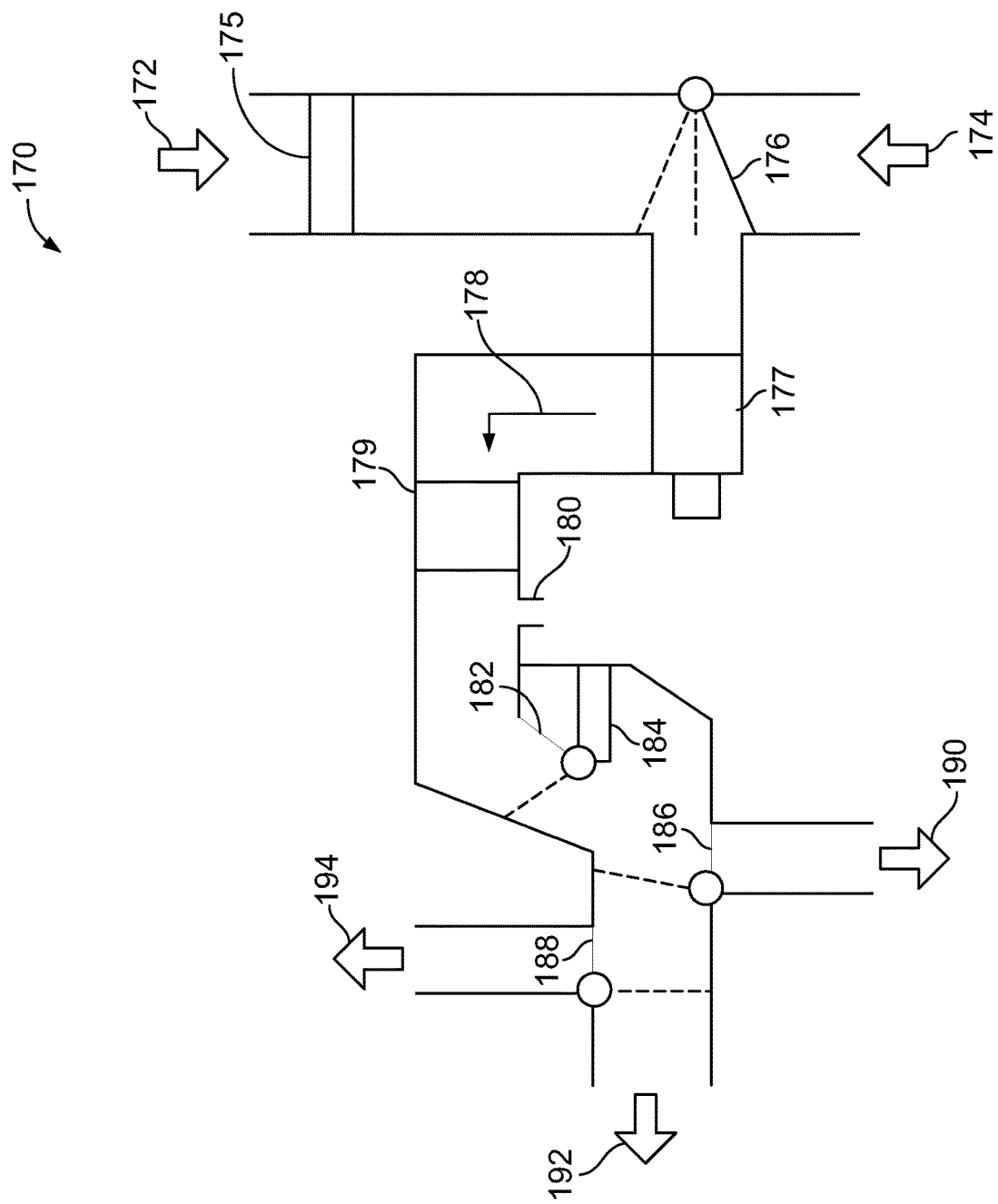
FIG. 3B is a diagram illustrating an example of a portion of a heating, ventilation, and air-conditioning system for a vehicle.

FIG. 3B illustrates an example of a portion of a vehicle HVAC system, referred to as an HVAC system 170 herein. Each of the front HVAC system 104 and the rear HVAC system 106 may include components similar to the HVAC system 170. The HVAC system 170 includes an ambient inlet to selectively receive air from outside the vehicle as represented by arrow 172 and a cabin inlet to receive air from inside the vehicle as represented by arrow 174. An air filter 175 may operate to filter air received from outside the vehicle. A recirculation flap 176 may operate to selectively permit air to flow from outside or inside the vehicle to the HVAC system 170. In FIG. 3B, the recirculation flap 176 is shown in a position to permit air from outside the vehicle to flow into the HVAC system 170.

A blower 177 may operate to move the air throughout the HVAC system 170. For example, the blower 177 may direct air to flow as represented by arrow 178 to an evaporator core 179. The evaporator core 179 may operate to selectively cool the air and remove moisture. An evaporator drain 180 may operate to remove undesired material from the evaporator core 179, such as the moisture. A blend door 182 may selectively direct the air flow to pass through a heat source 184, such as a heater core, or to route the air flow around the heat source 184.

For example, the blend door 182 may operate to direct the air flow through the heat source 184 in response to a passenger request including heat, such as an activate heat request or an activate defog request. Alternatively, if a passenger requests cool air, the blend door 182 may be positioned to prevent the air flow from passing through the heat source 184 and the evaporator core 179 may be activated to cool the air flow.

A first mode door 186 and a second mode door 188 may also operate to direct the air flow based on passenger requests. For example, the first mode door 186 and the second mode door 188 may be positioned such that air may travel to floor vents as represented by arrow 190, to main upper vents as represented by arrow 192, or to defrost vents as represented by arrow 194.

Referring back to FIG. 3A, a first thermal expansion valve 107 may operate to adjust a flow rate of refrigerant passing therethrough based on thermal conditions of the refrigerant. A second thermal expansion valve 109 may operate to adjust a flow rate of refrigerant passing therethrough based on thermal conditions of the refrigerant. The second thermal expansion valve 109 may include a shut-off valve to selectively prevent refrigerant from flowing to the second evaporator of the rear HVAC system 106.

It is contemplated that the thermal management system 100 may operate in an example in which a first thermal expansion valve includes shut-off valve characteristics and a second thermal expansion valve does not include shut-off valve characteristics.

A first blower may be in fluid communication with a first evaporator of the front HVAC system 104 similar to the configuration described in relation to the HVAC system 170 above. A second blower may be in fluid communication with a second evaporator of the rear HVAC system 106. In contrast to the thermal management system 50 of FIG. 2, the thermal management system 100 does not include a FESOV to control refrigerant flow to the first evaporator of the front HVAC system 104. Exclusion of the front shut-off valve provides a cost savings and provides noise, vibration, and harshness (NVH) benefits and improves the passenger's ride experience since operation of the front shut-off valve may be noisy. For example, operation of the system with a front shut-off valve generates undesired noise when refrigerant flow and/or pressure is adjusted when flowing through the front shut-off valve.

A control unit 112, also referred to as a controller herein, may be in electrical communication with the front HVAC system 104 and the rear HVAC system 106 to selectively direct operation thereof. One or more blend doors may be included in the conduit system to selectively move air at various temperatures to the vehicle cabin based on signals received from the control unit 112. For example, the control unit 112 may include programming to direct operation responsive to detected operating conditions of the thermal management system 100 as further described herein.

An internal heat exchanger 120 may operate to assist in controlling thermal conditions of refrigerant received from a cabin climate control system 122 and a compressor 124. The cabin climate control system 122 may be, for example, a cooling module. In an embodiment in which the cabin climate control system 122 is a cooling module, the cabin climate control system 122 may include a condenser 128, a radiator 130, and an air conditioning (A/C) fan 132. The compressor 124 and the A/C fan 132 may be in electrical communication with the control unit 112 to receive operating instructions therefrom. The compressor 124 may include a speed sensor 125 in electrical communication with the control unit 112 to provide signals indicating compressor 124 operating speeds. The control unit 112 may direct operation of refrigerant and coolant flow within the thermal management system 100 based on the received signals from the speed sensor 125.

A chiller 140 may operate to exchange heat between refrigerant of a portion of the thermal management system 100 relating to the vehicle cabin and coolant of a portion of the thermal management system 100 relating to a high voltage battery by facilitating fluid communication therebetween. The chiller 140 assists in providing a thermal management system architecture with a single thermal loop to manage the thermal conditions of both the vehicle cabin and the high voltage battery. Coolant may flow from the chiller 140 to a high voltage battery 144 via a first three-way valve 146 and a second three-way valve 148. A pump 150 may operate to control movement of the coolant.

The first three-way valve 146 may operate to make use of a by-pass line such that the coolant flowing from the chiller 140 will selectively not enter the high voltage battery 144. The second three-way valve 148 may operate to direct coolant to the high voltage battery 144 and/or to the radiator 130. For example, operating conditions of the thermal management system 100 may be such that coolant may be directed to flow through the radiator 130 to assist in managing thermal conditions of the high voltage battery 144.

An internal temperature sensor 160 and an external temperature sensor 162 may each be in electrical communication with the control unit 112 to send signals indicating detected temperature conditions. The internal temperature sensor 160 may monitor thermal conditions of, for example, the vehicle cabin. The external temperature sensor 162 may monitor thermal conditions of, for example, ambient conditions outside the vehicle cabin. The control unit 112 may include programming to direct operation of the components of the thermal management system 100 to manage thermal conditions of the vehicle cabin and the high voltage battery 144 without requiring multiple thermal loops and additional components which may have negative impacts on NVH standards.

For example, the programming may direct activation of the first blower and/or the second blower to move air through a respective evaporator of a respective HVAC system to the vehicle cabin. The first blower and/or the second blower may be activated based on detected conditions of the components of the thermal management system 100 or a detected temperature within the vehicle cabin or a detected temperature of the ambient conditions outside the vehicle cabin.

In one example, when the chiller 140 is in operation to manage thermal conditions of the high voltage battery 144, refrigerant will be flowing through the evaporators and a passenger may have requested the climate control system 122 to be off. For example, the passenger may turn the A/C system off. In previous systems, the A/C system may continue to output cool air regardless of the passenger request so that the high voltage battery continues to be cooled. The refrigerant flow through the evaporators may cause undesired cooling temperature conditions to passengers within the vehicle cabin. To avoid the undesired cooling temperatures within the vehicle cabin, the control unit 112 may activate the first blower and/or the second blower to move air at a predetermined temperature to the vehicle cabin. For example, blend doors of one of the HVAC systems may be positioned to facilitate a desired air flow in combination with selected operation of a respective heater core and a respective evaporator. The predetermined temperature may be based on temperatures detected by the internal temperature sensor 160 and/or the external temperature sensor 162. In one example, the air may be moved through the respective HVAC system at a temperature equal to or greater than the detected ambient temperature to maintain a comfortable temperature within the vehicle cabin while continuing to cool the high voltage battery 144 and maintain refrigerant flow through the evaporators. In another example, the air may be moved at a temperature equal to or greater than the detected vehicle cabin temperature to maintain comfortable temperature within the vehicle cabin while continuing to cool the high voltage battery 144 and maintain refrigerant flow through the evaporators.

In the event the detected ambient temperature is within a predetermined range equating to an uncomfortable passenger temperature, the control unit 112 may direct operation of the HVAC systems to move air to the vehicle cabin based on temperature conditions detected by the internal temperature sensor 160.

Figure 4:
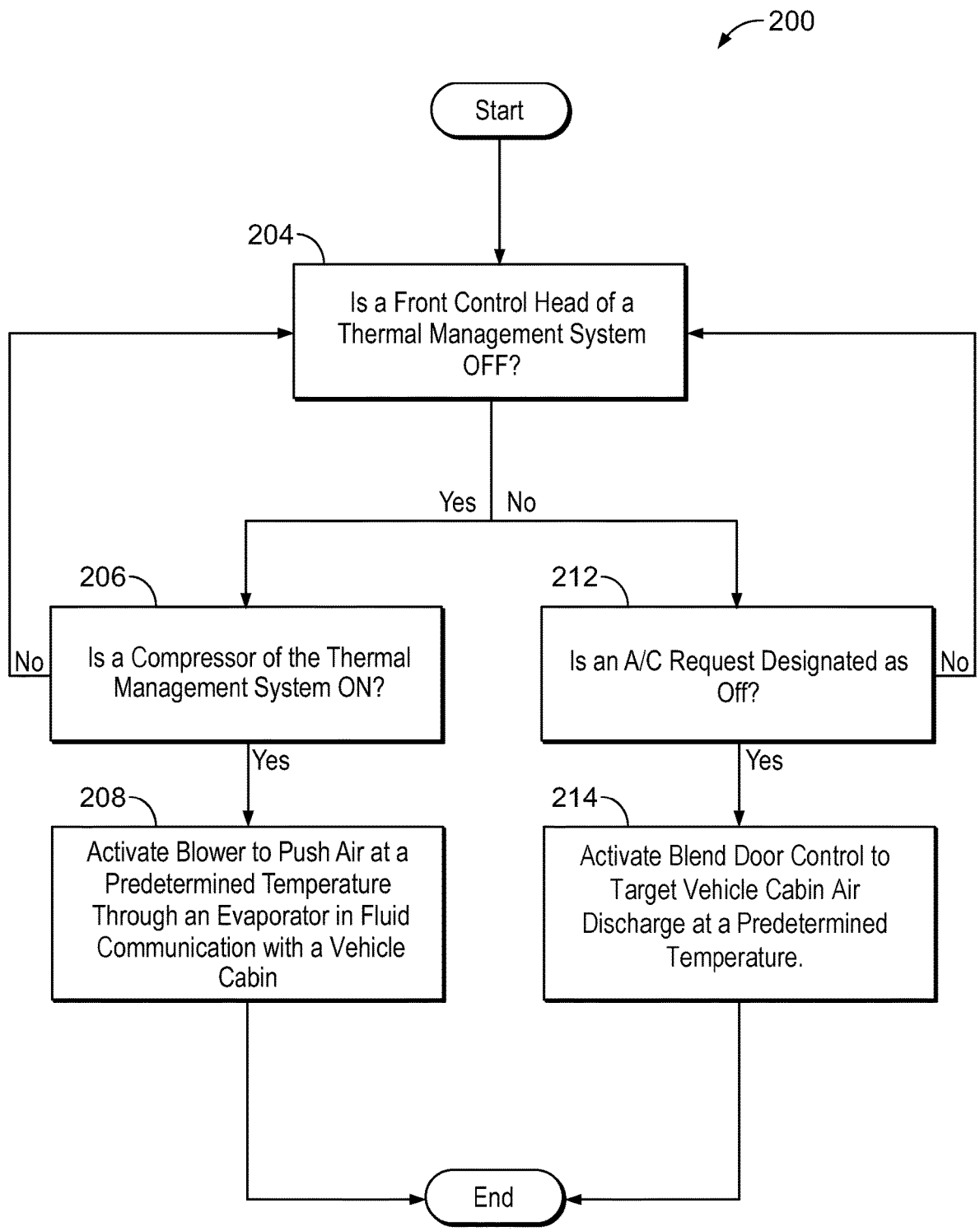
FIG. 4 is a flow chart illustrating an example of a portion of a control strategy for a vehicle thermal management system.

FIG. 4 is a flow chart illustrating an example of a control strategy for operation of a vehicle thermal management system, referred to as a control strategy 200 herein. The control strategy 200 may be used to direct operation of, for example, components of the thermal management system 100 described above. In operation 204, a controller may detect whether a front control head of a thermal management system is in an on or off position. The front control head may be, for example, a user interface of a climate control system for a passenger to input climate control commands.

In the event the front control head is off, the controller may detect an operating status of a compressor of the thermal management system in operation 206. Detection of the operating status of the compressor may be based on compressor revolutions per minute (RPM) detected by a sensor of the compressor. For example, if an RPM of the compressor is detected as reflecting a moderate or high operation state within a speed range in which a potential exists for liquid to return to the compressor, the control strategy 200 may be activated. In one example, such a compressor speed may be greater than 2500 RPM.

Alternatively, evaporator operating conditions may be examined to identify whether to advance to operation 208 or revert back to operation 204. For example, evaporator operating conditions may be examined to identify whether a potential for a freeze condition exists. In one example, if an evaporator temperature is less than or equal to 2° C. plus a hysteresis, such as 4.5° C., the controller may direct advancement to operation 208.

In the event the controller detects that the compressor is in an on state in operation 206, the controller may direct activation of components of the thermal management system to maintain desired thermal conditions of the vehicle cabin while appropriately managing thermal conditions of a high voltage battery. For example, the controller may direct a blower to push air through an evaporator and/or a heater core in fluid communication with a vehicle cabin in operation 208 to obtain a selected temperature. The selected temperature may represent a temperature or range selected to reflect desired vehicle cabin thermal conditions for passengers. The selected temperature may be predetermined or may be selected based on a detected vehicle cabin temperature or a detected ambient temperature outside the vehicle.

The controller may activate other components of the thermal management system according to predefined operating conditions in operation 208. A speed of the blower may be set to a low speed to further minimize impact to vehicle cabin passengers. A low speed as used herein may be a predetermined value, a calibrated value, or a configured value. In one example, a low speed may be approximately equal to 25% of a max speed. In one example, three volts may be supplied to the blower to operate at a low speed. In another example, a front air distributor may be set to a floor mode to minimize pushed air felt by the vehicle cabin passengers. In another example, a front air inlet door may be set to an outside air position. In another example, a temperature of the pushed air may be selected based on detected vehicle cabin temperatures plus an offset. In yet another example, a temperature of the pushed air may be sequentially varied based on changes to vehicle cabin temperature over a time-period.

In the event the controller detects that the front control head is in an on state in operation 204, the controller may detect whether an A/C request is designated as off in operation 212. In the event the A/C request is designated as on, the controller may return to operation 204. In the event the A/C request is designated as off, the controller may proceed to operation 214.

In operation 214, the controller may direct operation of the thermal management system to address a scenario in which a passenger does not want to activate the A/C system but A/C system operation is needed to assist in managing thermal conditions of the high voltage battery. For example, an automatic blend door control may direct a target air discharge temperature to be no lower than a predetermined temperature range based on a detected ambient temperature plus an offset. In this example, the A/C system may be run without negatively impacting passenger comfort.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle thermal management control strategy comprising:
responsive to detection of an air-conditioning system off request, outputting a command, by a controller, for a blower to direct airflow across a heat source en route to a vehicle cabin to maintain a temperature of the vehicle cabin at or above a detected ambient temperature outside the vehicle cabin; and
responsive to the detection of the air-conditioning system off request, outputting a command, by the controller, to a chiller to maintain coolant flow and to output a command to an evaporator to maintain refrigerant flow.

2. The control strategy of claim 1, wherein the controller is further programmed to update a temperature of the airflow based on changed and detected vehicle cabin temperatures.

3. The control strategy of claim 1, wherein the controller is further programmed to control a flow of refrigerant to an evaporator without a use of a shut-off valve.

* * * * *